(12) United States Patent
Mateer et al.

(10) Patent No.: US 8,914,850 B1
(45) Date of Patent: Dec. 16, 2014

(54) CONTEXT AWARE TRANSACTIONS PERFORMED ON INTEGRATED SERVICE PLATFORMS

(75) Inventors: Michael T. Mateer, Omaha, NE (US); James K. Boutcher, Omaha, NE (US); Jesse Andersen, San Francisco, CA (US)

(73) Assignee: West Corporation, Omaha, NE (US)

( * ) Notice: Subject to any disclaimer, the term of this patent is extended or adjusted under 35 U.S.C. 154(b) by 41 days.

(21) Appl. No.: 13/273,413

(22) Filed: Oct. 14, 2011
(Under 37 CFR 1.47)

(51) Int. Cl.
*H04L 29/06* (2006.01)
*H04M 3/493* (2006.01)

(52) U.S. Cl.
CPC .............. *H04M 3/493* (2013.01); *H04L 63/08* (2013.01)
USPC ........................................................... 726/4

(58) Field of Classification Search
None
See application file for complete search history.

(56) References Cited

U.S. PATENT DOCUMENTS

| | | | |
|---|---|---|---|
| 2003/0135582 A1* | 7/2003 | Allen et al. | 709/217 |
| 2007/0208858 A1* | 9/2007 | Ra et al. | 709/227 |
| 2008/0311934 A1* | 12/2008 | Soderstrom | 455/466 |
| 2009/0138606 A1* | 5/2009 | Moran et al. | 709/227 |
| 2010/0005520 A1* | 1/2010 | Abbot et al. | 726/6 |
| 2010/0158236 A1* | 6/2010 | Chang et al. | 379/265.03 |
| 2011/0321139 A1* | 12/2011 | Jayaraman et al. | 726/4 |
| 2013/0006874 A1* | 1/2013 | Klemm | 705/304 |

* cited by examiner

*Primary Examiner* — Gilberto Barron, Jr.
*Assistant Examiner* — Malcolm Cribbs

(57) ABSTRACT

Certain aspects of the present disclosure relate to user access to an application service that references user account information and previous user action information. One example method may include receiving, via a receiver device, user input information to access an application, the user input information including at least one action request and authorizing the user to access the application. The method may also include storing the user input information as part of a contextual history information record in a database memory, generating a response message to the selected at least one action request based on the contextual history information, and forwarding the response message to the user via a transmitter device.

14 Claims, 7 Drawing Sheets

CONTEXT AWARE TRANSACTIONS PERFORMED ON INTEGRATED SERVICE PLATFORMS

FIELD OF THE INVENTION

The present disclosure relates generally to communication systems and, more specifically, to a method, apparatus and computer-readable instructions configuring context aware transactions performed on integrated service platforms to provide a user with proactive and predictive transactions based on user account information.

BACKGROUND OF THE INVENTION

Several systems are available that provide services to users which are typically accessible using various communication channels. These services may include one or more web services and the communication channels may include audio call, short message service (SMS), web, mobile and social media. The user may typically use several of the channels to access multiple of the services for carrying out a same or related tasks. The user may frequently need to carry out multiple sessions related to a same task or related tasks using multiple services by way of different communication channels. For example, the user may need to switch from a first session using a first service accessible via a first communication channel to a second session using a second service accessible via a second communication channel. In such scenarios, the current systems typically drop the user's context for the first session and initiate a completely new context for the second session. Without a context from the first session, the second service may need to collect user information all over again before being able to provide the required solution to the user. This information may include user account information, user request and the like. This may lead to the user needing to start all over again on every new session which is very inefficient and may lead to loss of time, system resources, increased cost of running the system and user dissatisfaction.

SUMMARY OF THE INVENTION

Certain aspects of the present disclosure provide a method for configuring context aware sessions. The method generally includes providing a first session using a first communication channel and using contextual information of the first session to provide a second session using a second communication channel, wherein the second session is associated with the first session.

Certain aspects of the present disclosure provide an apparatus for configuring context aware sessions. The apparatus generally includes at least one processor configured to provide a first session using a first communication channel and use contextual information of the first session to provide a second session using a second communication channel, wherein the second session is associated with the first session; and a memory coupled to the at least one processor.

Certain aspects of the present disclosure provide a computer-program product for configuring context aware sessions, the computer-program product generally includes a non-transitory computer-program product for configuring context aware sessions, the computer-program product comprising instructions for providing a first session using a first communication channel and using contextual information of the first session to provide a second session using a second communication channel, wherein the second session is associated with the first session.

Certain aspects of the present disclosure provide a method that includes receiving, via a receiver device, user input information to access an application, the user input information including at least one action request. The method may also include authorizing the user to access the application, storing the user input information as part of a contextual history information record in a database memory, generating a response message to the selected at least one action request based on the contextual history information, and forwarding the response message to the user via a transmitter device.

Certain aspects of the present disclosure provide an apparatus that includes a receiver configured to receive user input information to access an application, the user input information including at least one action request. The apparatus may also include a processor configured to authorize the user to access the application, store the user input information as part of a contextual history information record in a database memory, and generate a response message to the selected at least one action request based on the contextual history information. The apparatus may also include a transmitter configured to forward the response message to the user.

Figure 1:
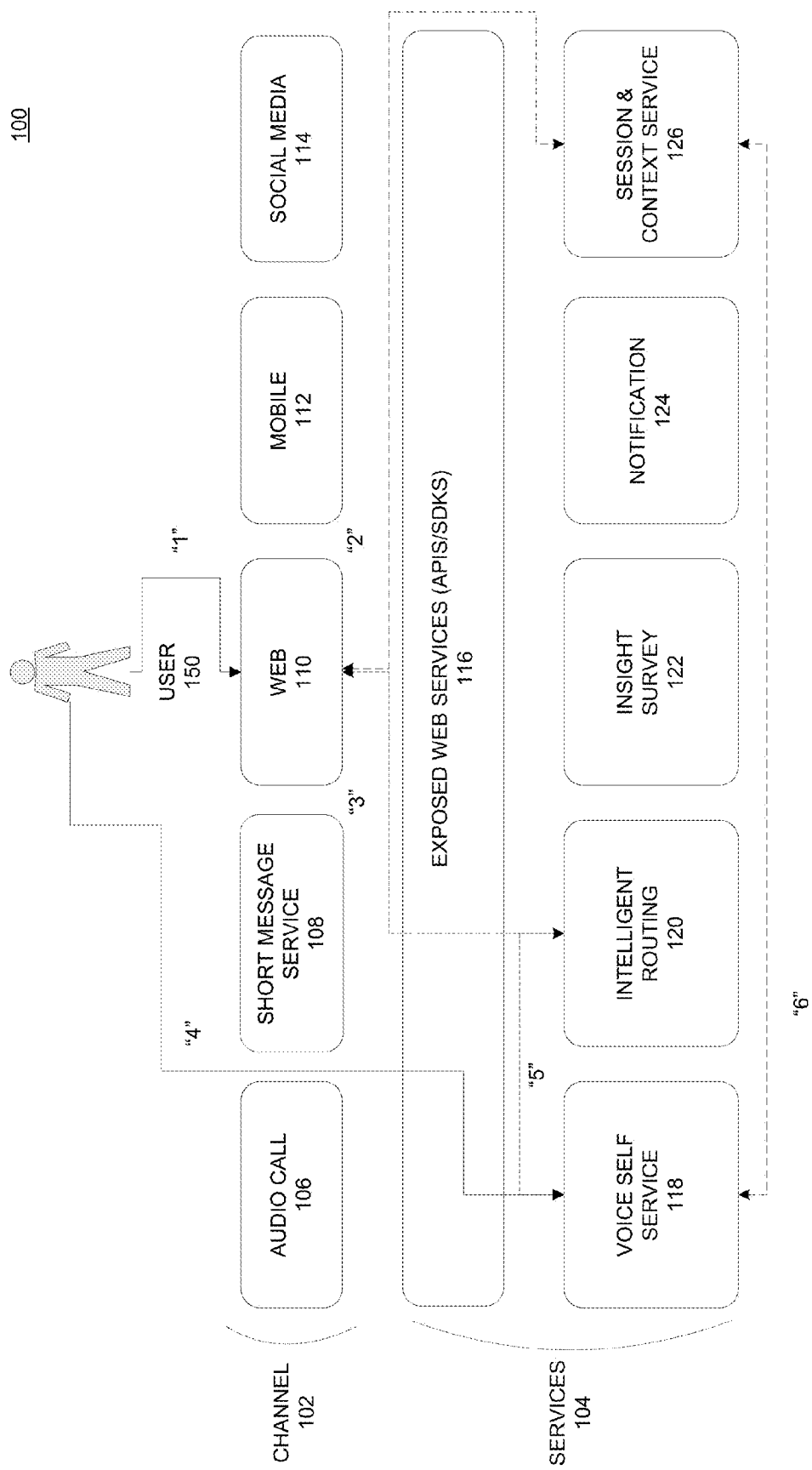
FIG. 1 is a block diagram of a communications system conceptually illustrating an example of context aware sessions in accordance with certain aspects of the present disclosure.

The foregoing summary, as well as the following detailed description of certain embodiments of the present invention, will be better understood when read in conjunction with the appended drawings. The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION OF THE INVENTION

FIG. 1 is a block diagram of a communications system 100 conceptually illustrating an example of context aware sessions in accordance with certain aspects of the present disclosure.

System 100 provides services 104 to a user 150 which are accessible using various communication channels 102. Services 104 include a voice self service 118, an intelligent routing service 120, an insight survey service 122, a notification service 124 and a session and context service 126. Communication channels 102 include audio calls 106, short message service 108, web 110, mobile 112 and social media 114. System 100 may also include an interface service 116 providing an interface between the communication channels 102 and the services 104. It may be appreciated that the communication channels 102 and services 104 shown as part of the system 100 are only by way of an illustrative example and the system 100 may include any number and types of communication channels and services. For example, services 104 may include any one or more web services or applications and the communication channels may include any channel that may be used for communication between a user and the services.

The user 150 may typically use several of the channels 102, one or more at a time, to access one or more of the services 104 for carrying out sessions related typically to a same task or related tasks. The user 150 may frequently need to carry out multiple sessions related to the same task or related tasks using multiple services 104 by way of different communication channels 102. For example, the user may need to switch from a first session using a first service accessible via a first communication channel to a second session using a second service accessible via a second communication channel. In another example, the user 150 may access one or more of the services 104 using one or more communication channels 102.

According to an example embodiment, the session and context service 126 records contextual information for every user session, typically in real time. The intelligent routing service 120 is responsible for transferring user context from one channel/service to another channel/service. The contextual information may include user account information, user events during a session, user requests made during a session and the like. Thus, system 100 provides context aware transactions with an ability to pickup where the user left a session or transaction no matter what communication channel 102 the user may use.

FIG. 1 illustrates an example scenario, wherein the user 150 uses system 100 for initiating two sessions for carrying out related tasks. For example, at step 1 the user 150 is interfacing with a client's website in a first session to try and order a "Pay Per View" movie. At step 2, while the user 150 is navigating the website, contextual information relating to the first session is constantly being sent to the Session & Context Service 126.

At step 3 the user 150 needs assistance. For the sake of this example the user may hit a "Click to Call" button on the web page during the first session. This sends a message to the intelligent routing service 120 with collected user data and contextual information from the first session relating to for example what the user 150 was trying to do. In certain aspects, an 8YY number is returned to the user that happens to be provisioned to hit a Voice Self Service (VSS) Platform 118.

At step 4, when the user's call hits the Voice Self Service 118, the Platform notifies the intelligent routing service 120 of the call arrival.

At step 5, the intelligent routing service 120 returns the user data and previous channel context from the first session to the VSS application. The application then picks up where the website left off and processes the "Pay Per View" transaction in a second session using the contextual information from the first session.

At step 6, while the user 150 is navigating through the VSS application constant contextual information relating to the second session is sent to the session & context service 126.

At this point the user 150 may be serviced via an automated VSS application or if the user is still having difficulty he may select Help within the VSS application and the application may send an agent request message to the intelligent routing service 120 and another 8YY number may be returned to the user 150 that is targeted for a specific contact center or Agent. The customer data and context information from the second session may then be passed to the agent and a third session may be initiated between the user and the agent and the user may pick up where he left off in the second session.

Examples of "user data" include a service name such as "bill pay" and certain operations/tasks to complete such services, such as authorize a user, obtain account balance, select payment method, enter payment information, submit payment, and confirmation of payment. Each operation/task includes key data/attributes which are stored in memory while the user interacts with the self service channel. The user data is sent to a web service within the host environment that stores and maintains the data in a database. The user data is accessed in real-time, and the key data is collected when a step/task is completed. The session and context service 222 is a centralized database accessible by any of the services.

In one example, a WIFI television application initiates service with the context service DB 222 by implementing endpoint channels which have applications that are programmed to interface with the hosted environment for the context data collection. Endpoint channels have applications that are programmed to interface with the web service for the context data collection. The APIs and SDKs allow the 3rd parties to access the user data by provisioning an application ID and/or client ID that must be provisioned on the hosted environment site in order for them to have access to certain services.

Examples of predictive transactions may include historical contextual information that is used to issue proactive notifications via any channel (based on customer preferences). For example, certain features, such as a payment reminder (if we know that the first Tuesday of the month a user calls-in or logs-in to obtain an account balance and pay their bill, then in response a proactive notification may be used to inform the user of their account balance and allow them to pay their bill and submit their payment. In another example, if a user initiates a call via mobile 212, the call processing system may predict that the user is calling about their account balance and their desire to pay a bill. In this case, the inbound self service "call" would determine if there is a predictive transaction that may be retrieved from the database and then prompt the consumer to confirm the reason for the call. Once the purpose of the call is confirmed, the application will advance to a specific part of the application procedures and perform the interaction. In other words, a prediction may be made and presented to the user for convenience and confirmation by the user. Such a configuration provides the user with one or more opportunities to turn down or accept automated call processing feedback, menu options, and application advancement opportunities without initiating any new request data. The predeterminations or predictions may be performed by the call processing application or user data application upfront in an effort to save the user time and without requiring any initial user input. The predictions may be made the moment the user logs-in, calls-in, connects, etc.

In certain examples, Natural Language Processing (NLP) is a service that may be used with ASR, SMS, and Social Media, and corresponding decisions/interactions may be automated for these communication channels 102 and context information stored in the session and context service 126.

Figure 2A:
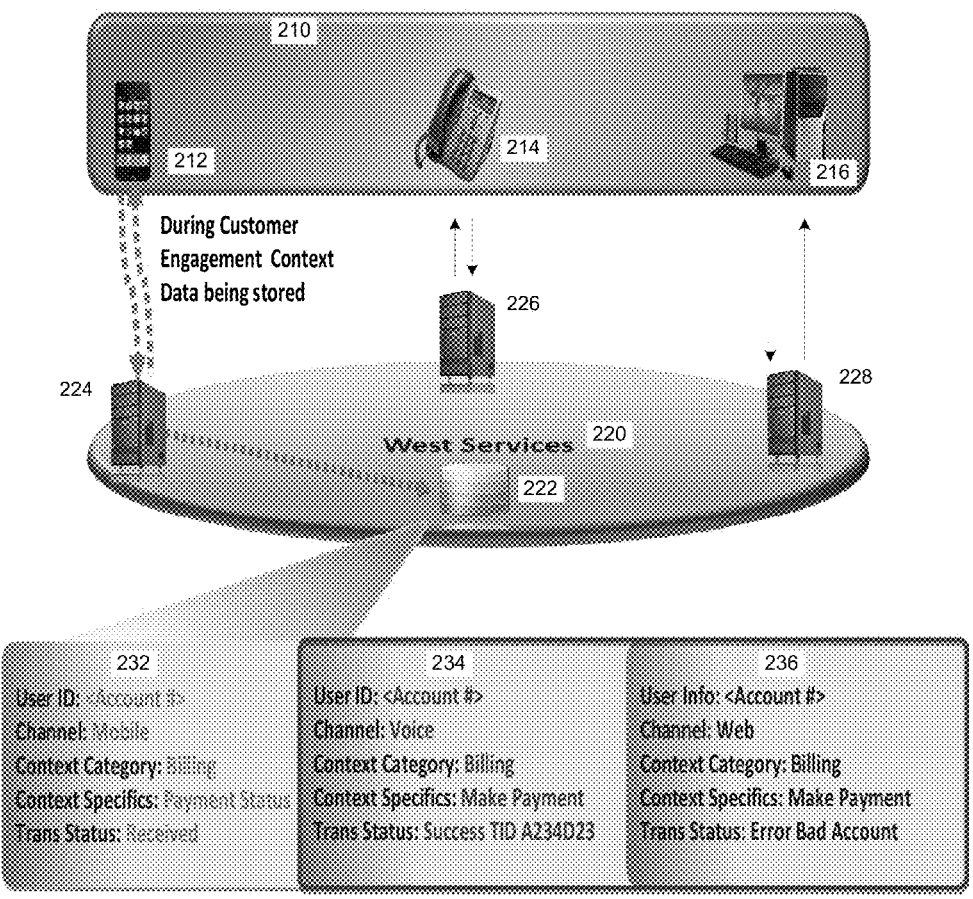
FIG. 2A is a block diagram of a communication system illustrating an example of multi channel context aware transactions in accordance with certain embodiments of the present disclosure.

FIG. 2A is a block diagram of a communication system 200 conceptually illustrating an example of multi channel context aware transactions in accordance with certain aspects of the present disclosure.

System 200 includes multiple communication channels 210 including mobile 212, fixed line 214 and computer 216. The system 200 also provides multiple services 220 such as services 222, 224, 226 and 228. The services 220 may be a web service or any other type of service. Service 222 is a session and context service for recording user data and contextual information from user sessions. In system 200, service 224 is accessible via mobile 212, service 236 is accessible via fixed line 214 and service 228 is accessible via computer 216.

FIG. 2A illustrates an example of a user undertaking multiple sessions using the various communication channels 210 available for making a payment for a bill. The user first initiates a first session on the web with the service 228 using the computer 216 as communication channel. While the user tries to access his account and pay the bill, user data and context information relating to the first session is constantly sent and stored in the session and context service 222.

When the user fails to pay the bill using the first session, the user initiates a second session with the service 226 using the fixed line 214 as the communication channel. When the user's call arrives into the system using the fixed line 214, the user is authenticated and context data is searched. In an aspect, the user may be prompted to enter an account number and any existing (stored) user context information may be searched for in the service 222 using the user account number. The context data from the first session is retrieved from service 222 and used for setting up the second session. As the user proceeds in the second session and successfully pays the bill, the context information relating to the second session is constantly sent and stored in service 222.

The user may initiate a third session with service 224 using mobile 212 as the communication channel to check a status of the bill payment. Again when a mobile call is received into the system 200, the user is authenticated and context data is searched in service 222 similar to the second session above. The user context data from the second session is retrieved from service 222 and used for setting up the third session and the user is promptly sent a notification on the mobile device 212 that the bill payment is received.

User data may include attributes that identify the consumer and the actions taken by the user. The user data is sent to the context services and may be dependent on the applications needed (i.e., user interactions with such application). Every time a user submits new data it is sent to be stored by the context service. According to one example, a WiFi television application may initiate a service with the context service database. The application is part of the WiFi enabled TV created by the application programming interfaces (APIs) provided by the TV manufacturer. The APIs and SDKs provide $3^{rd}$ parties with access to the context services via a data as a service (DaaS) channel. This provides an interface for the third parties to register to access the user information. Examples of the user transactions types may include paying a bill, ordering pay-per-view, voting, polling, etc.

Figure 3:
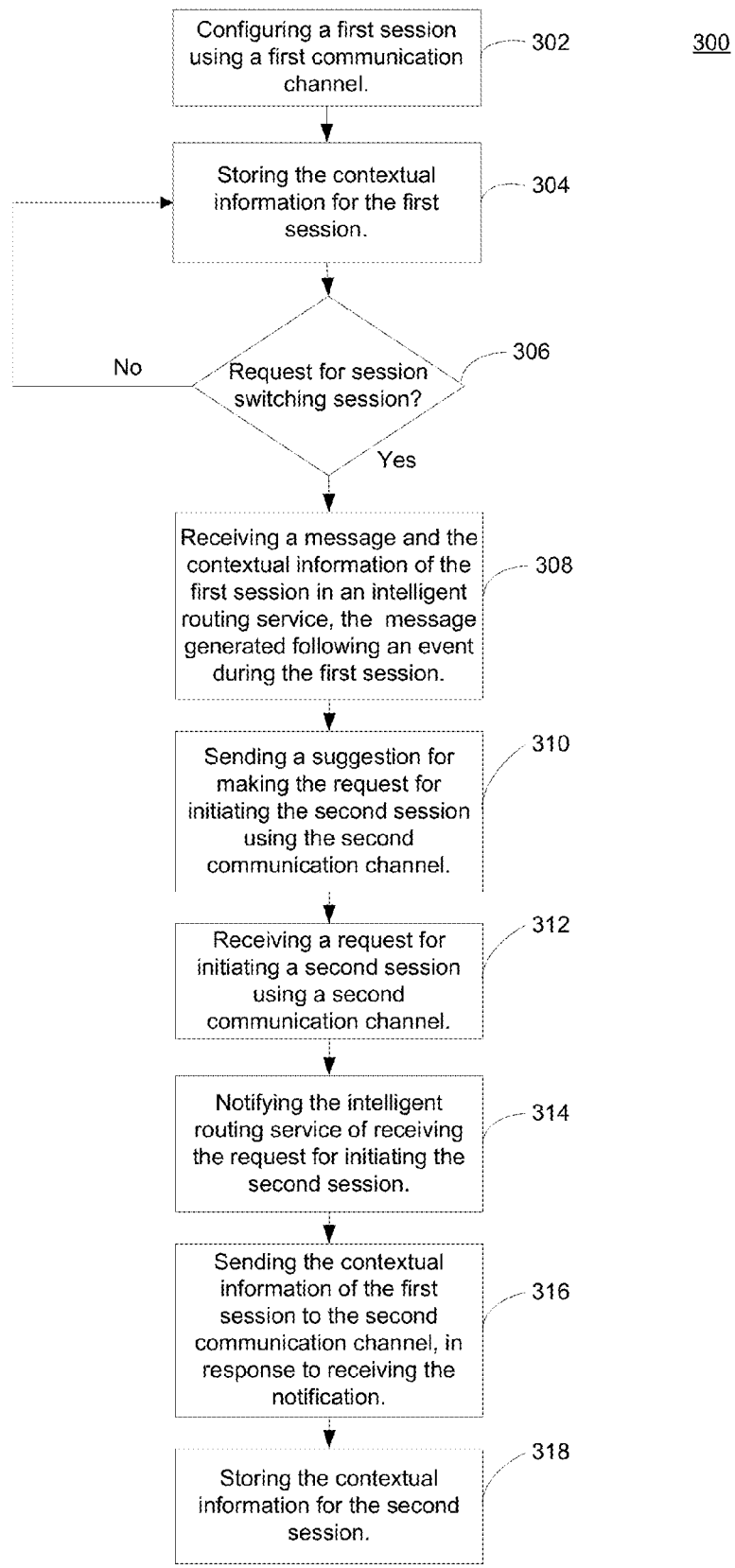
FIG. 3 illustrates example for diagram providing a multi-channel context aware session in accordance with embodiments of the present disclosure.

FIG. 3 illustrates example operations 300 for multi-channel context aware session in accordance with certain aspects of the present disclosure. Operations 300 begin at 302 by providing a first session to a user using a first communication channel. In certain aspects the first session may be provided with a first service using the first communication channel. At 304, contextual information of the first session is stored typically in by a session and context service. At 306, if a request for switching sessions is not received the process moves back to 304. If a request for switching sessions is received at 306, the process proceeds to 308 where a message and the contextual information of the first session is received in an intelligent routing service, the message typically generated following an event during the first session. The event may be as simple as clicking a hyperlink on a web page during the first session.

At 310, a suggestion for making the request for initiating the second session using the second communication channel is sent typically from the intelligent routing service to the user. At 312, a request for initiating a second session using a second communication channel is received in the system. In certain aspects, the request for initiating the second session is received at a second service. At 314, the intelligent routing service is notified of receiving the request for initiating the second session at the second service. At 316, contextual information of the first session is sent by the intelligent routing service to the second communication channel, in response to receiving the notification. At 318, contextual information for the second session is stored by the session and context service.

Figure 2B:
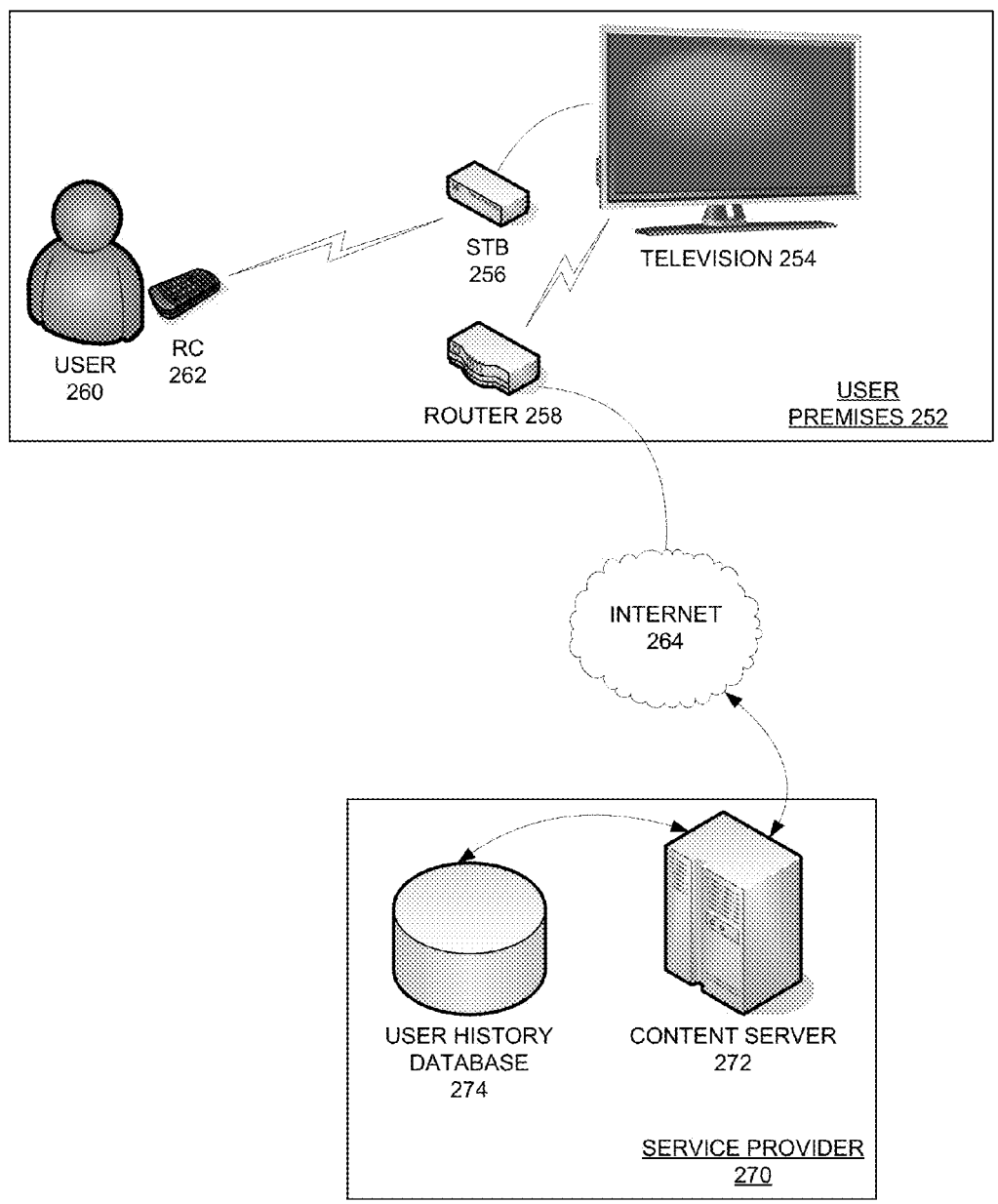
FIG. 2B is another block diagram of a communication system illustrating an example of proactive and predictive context aware transactions in accordance with certain embodiments of the present disclosure.

FIG. 2B is a block diagram of a communication system 250 conceptually illustrating an example of proactive and predictive context transactions in accordance with certain aspects of the present disclosure.

System 250 includes user premises 252 and a service provider 270. The user premises may include a user's home, place of work or a combination of both. The service provider 270 may be an Internet service provider (ISP) a cable television provider, satellite television provider or another service provider, etc.

As illustrated in FIG. 2A, the context service may be provided to a variety of different contexts. FIG. 2B illustrates an example context service integrated with a WiFi enabled television 254. According to one example embodiment, a user 260 may access the television via a remote control (RC) device 262 to view various content channels, the Internet, and other WiFi television (TV) enabled services. For example, a user application may be accessed on the WiFi television 254 and presented to the user on the TV display. Example applications may include user services, such as e-mail, bill pay, banking, subscription services, games, network applications, etc. The user may select and operate the application via interaction with the set top box (STB) 256.

The STB 256 may integrate with the TV 254 to provide wireless Internet access via a router 258 located at the user's premises. The router 258 may connect to the Internet 264 and provide wireless Internet access to the end user via a service provider 270. The service provider 270 may include a content server 272 and user history database 274. The content server 272 may store and forward content data, such as applications, television shows, Internet services, etc. The user history database 274 may provide access to a multi-channel and multi-tenant customer profile information. The user may register for a particular service or application and submit personal information (e.g., name, address, username, password, credit card information, etc.). The user session may be associated with one or more contexts that are shared among the applications during the course of the user session. The context information may be stored in the user history database 274 during user interaction with one or more applications. Contextual information may include personal user information and other information, such as preferences, historical selection information, demographic information, user purpose information (e.g., pay a bill, receive technical assistance, complaints, etc). Such contextual information may be identified and recorded in the user history database 274 during the course of a user session.

Figure 4:
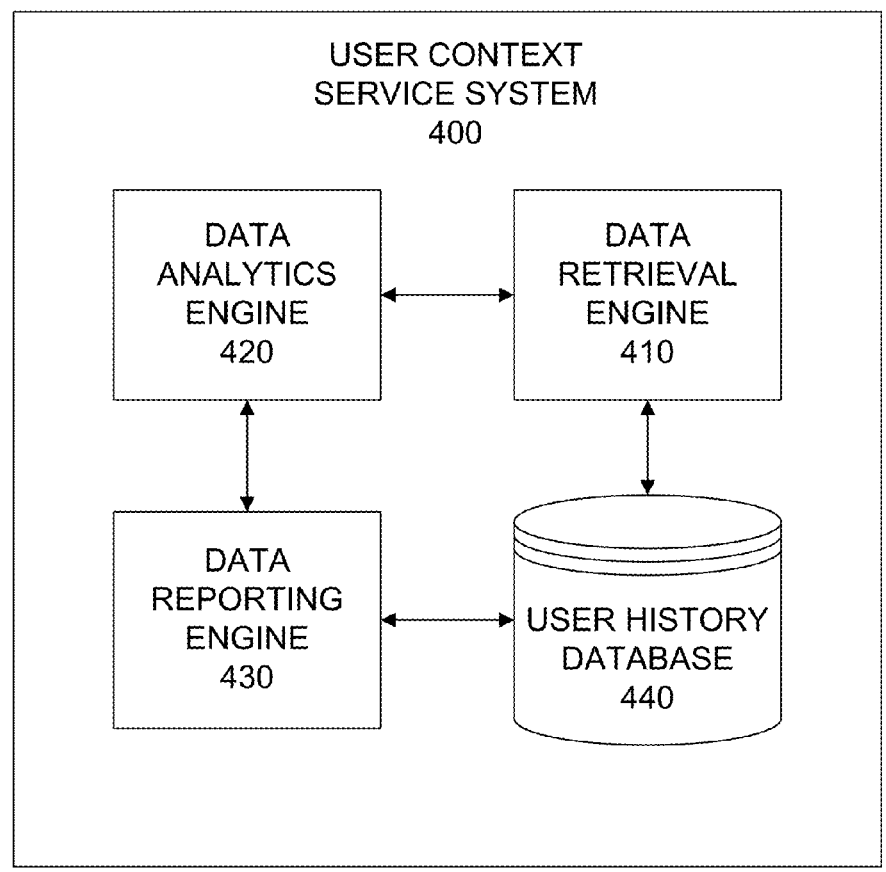
FIG. 4 illustrates an example system diagram of a network entity configured to perform the various operations of embodiments of the present disclosure.

FIG. 4 illustrates an example system diagram of a user context service system 400. In addition to the above-noted examples of contextual information, such information may be received from user input and applied to further a user transaction in the course of a single user session. In operation, a user 260 may select a particular operation or application by providing user input to the user context service system 400. Such information may be received and stored in a user history database 440. The user data may include a service name or application name, such as, for example, "bill pay", "subscription services", etc. The service name may include a series of operations or steps that must be completed by the user in order for the contextual information to be properly initiated and stored in the user history database 440. For instance, the user may select the service which prompts the user for a username and/or a password. The user may input such information and proceed to an authorization operation. The authorization may provide a particular secure socket, port, channel, etc. Once the authorization information is received and the secure channel is assigned to the user, the contextual information may be updated and stored in the history database 440.

Following an authorization procedure, the user 260 may be able to obtain account information, select a payment method, enter payment information, submit a payment and receive confirmation information. One or more of the above-noted information types may be recorded and stored as part of the user context information. The user data is received by an endpoint channel that has corresponding applications that are programmed to interface with the user context service system 400. Application programming interfaces (APIs) and software development kits (SDKs) may be used to connect and communicate with the context service system 400. Third parties may register and access use contextual information stored in the history database 440 by submitting an application identification (ID) and/or a client identification (ID) and receiving the corresponding permission.

The stored user contextual information may be received, updated and stored in real time. The contextual information may be stored in the history database 440. The information can be retrieved and accessed to issue proactive or predictive notifications to the user or third parties. The previously stored user contextual information may be retrieved and applied to new contexts in a proactive or predictive manner. For example previously stored user contextual information may be retrieved and applied to new sessions and applications operated by third parties. Once user contextual information has been received and stored in the history database 440, the user contextual information may be retrieved by the data retrieval engine 410 in response to a new user application being accessed or a new session being established by the user or a third party.

The user contextual information may be analyzed by the data analytics engine 420 to determine the required information for a particular predictive or proactive transaction performed by a third party application. For example, an automated third party initiated recurring user payment application may be invoked in response to an initial user payment transaction. The user inputted information may be received and stored in the user history database 440 during the course of a one-time user payment transaction to pay for a particular service (i.e., cable television service). The user context information may be accessed by the data retrieval engine 410 and a data analytics engine 420 to create an automated and recurring payment operation to begin sending reminders to the user at a fixed interval. For instance, the third party cable service provider may note that the user has called in to pay his or her bill the first Tuesday of the previous month.

In one example, the cable company may setup a proactive notification reminder via the data reporting engine 430 to notify the user via text message, e-mail, telephone call, etc. that there bill is due again. The user notification medium may be selected based on one or more portions of the historical user communication mediums noted in the user contextual information.

In another example, the cable company may setup a predictive action via the data reporting engine 430 to automatically initiate a user payment option when a user calls into the cable service company. The payment redirect may begin the moment that the user is identified and cross-correlated with the previous user contextual information stored in the user history database. For example, the user may enter a call to the cable company and be transferred to the payments center once the authorization, identification and/or other user information is identified. This type of predictive action may rely on the historical user contextual information to determine the purpose of the user's previous call(s) and automatically transfer the user to the payments center.

Figure 5:
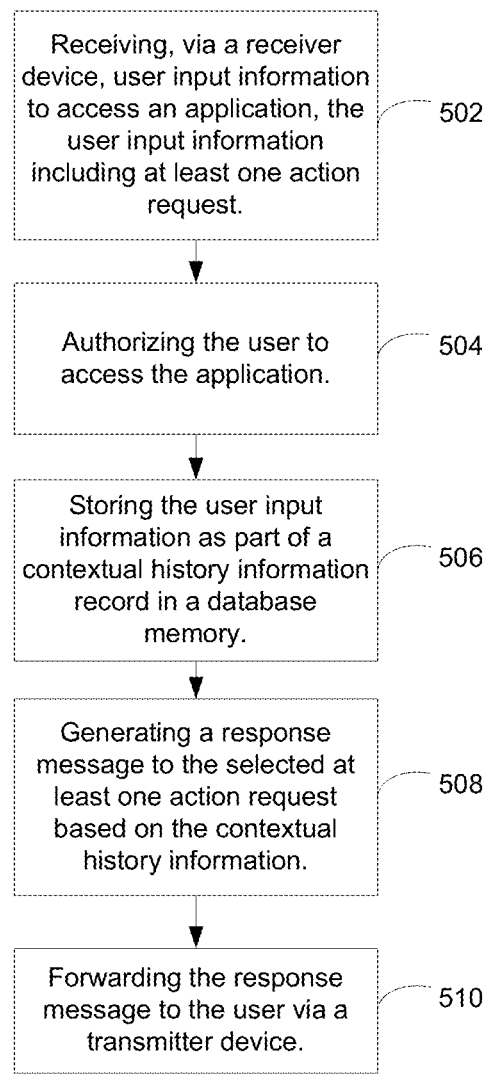
FIG. 5 illustrates an example flow diagram according to another embodiment of the present disclosure.

One example embodiment of the present disclosure may include a method as illustrated in the flow diagram of FIG. 5. Referring to FIG. 5, flow diagram 500 illustrates receiving, via a receiver device, user input information to access an application, the user input information may include at least one action request at operation 502. The user may be seeking access to an application or entering information in an effort to retrieve certain response information. The user may be pre-authorized or authorized by entering user credential information in order to access the application at operation 504. The method may also include storing the user input information as part of a contextual history information record in a database memory at operation 506. The method may further provide generating a response message to the selected at least one action request based on the contextual history information at operation 508. For example, the user may be requesting a summary of his or her bill for a particular service. The response information may be generated and sent to the user according to one or more preferences derived from the user's stored contextual history information. The response may be sent to the user via a transmitter device at operation 510.

Examples of user input information may include one or more of a username, password, user preference and query information. The method may also provide generating at least one additional response automatically based on a third party application, the at least one additional response may be based on at least a portion of the contextual history information. The third party may be a cable company that is seeking to track the user behavior of its customers. The store contextual history information may include user preferences, bill paying preferences, and records of user behavior (e.g., all the user calls are for paying bills or bill related). Other options may include account information, technical support, live agent access, etc. The third party application may create a reminder system that automatically generates future reminders based on present transactions. The third party application may generate a predictive response to offer the user a service independent of the user requesting the service (i.e., without the user requesting or knowing about the third party application). Such information may be derived from the contextual history information of the user that is stored in a historical user database.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A non-transitory computer-readable media includes both computer storage media and communication media including any medium that facilitates transfer of a computer program from one place to another. A storage media or medium may be any available device component that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
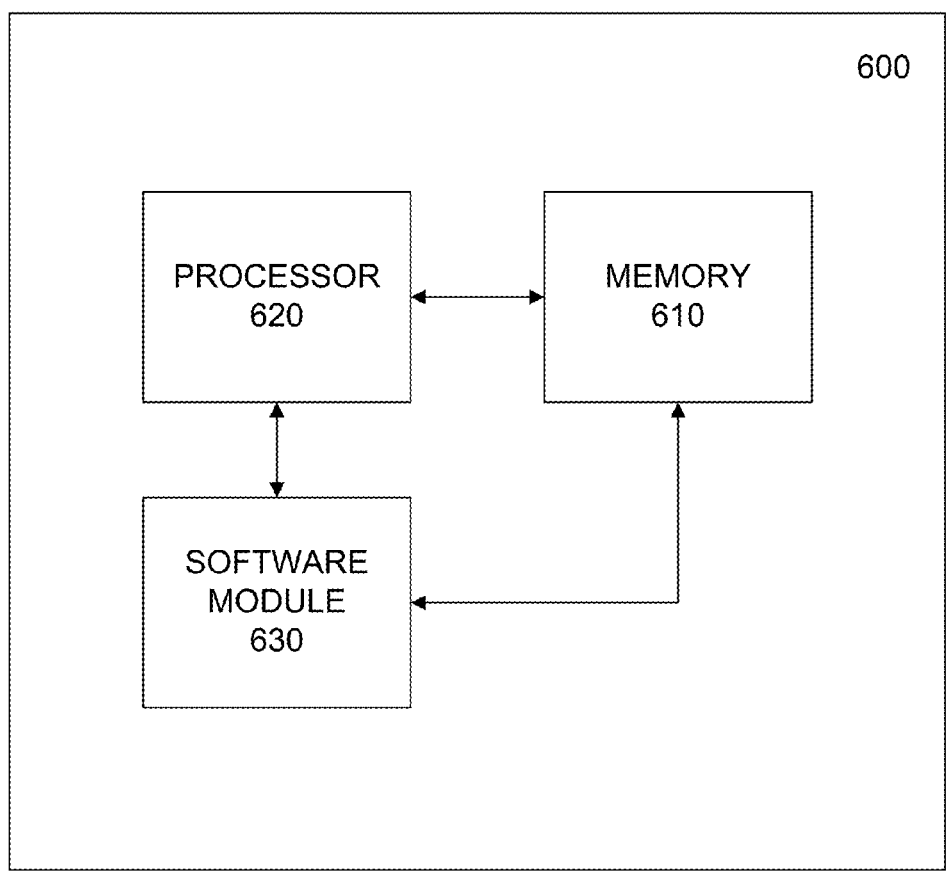
FIG. 6 illustrates an example network entity embodied with hardware and/or software to perform example operations based on one or more example embodiments of the present disclosure.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components of FIGS. 1-3.

As illustrated in FIGS. 1, 2A, 2B and 4, a memory 610 and a processor 620 may be discrete components of the network entity 600 that are used to execute an application or set of operations. The application may be coded in software in a computer language understood by the processor 620, and stored in a computer readable medium, such as, the memory 610. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method comprising:
   receiving, via a receiver device, user input information to access an application, the user input information including at least one action request provided by a user device;
   authorizing the user to access the application;
   storing the user input information as part of a contextual history information record in a database memory, the contextual history information identifying a first session and comprising selection events occurring during the first session and the at least one action request made during the first session;

identifying a user inquiry initiated by the user device;

creating a second session responsive to receiving the user inquiry and retrieving the contextual history information of the first session;

applying the contextual history information to the second session to resume a previous context of the first session;

generating a response message to the selected at least one action request based on the contextual history information and the user inquiry;

forwarding the response message to the user device via a transmitter device via the second session; and generating at least one additional response automatically based on a third party application, the at least one additional response being based on at least a portion of the contextual history information, wherein the at least one additional response is a reminder that is derived from previous user transactions and the stored contextual history information.

2. The method of claim 1, wherein the user input information comprises at least one of a username, password, user preference and query.

3. The method of claim 1, wherein the at least one additional response is a predictive response that is generated to offer the user a service independent of the user requesting the service, the service being derived from the contextual history information.

4. The method of claim 1, wherein the response message comprises information requested by the user and responsive to the action request.

5. The method of claim 1, wherein the action request is a request to receive at least one of bill information, account information, order video content and live agent access.

6. An Apparatus comprising:

a receiver configured to receive user input information to access an application, the user input information including at least one action request provided by a user device;

a processor configured to authorize the user to access the application;

store the user input information as part of a contextual history information record in a database memory, the contextual history information identifying a first session and comprising selection events which occur during the first session and the at least one action request made during the first session;

identify a user inquiry initiated by the user device;

create a second session responsive to receiving the user inquiry and retrieving the contextual history information of the first session;

apply the contextual history information to the second session to resume a previous context of the first session;

generate a response message to the selected at least one action request based on the contextual history information and the user inquiry; and a transmitter configured to forward the response message to the user device via the second session, wherein the processor is further configured to generate at least one additional response automatically based on a third party application, the at least one additional response being based on at least a portion of the contextual history information, and wherein the at least one additional response is a reminder that is derived from previous user transactions and the stored contextual history information.

7. The apparatus of claim 6, wherein the user input information comprises at least one of a username, password, user preference and query.

8. The apparatus of claim 6, wherein the at least one additional response is a predictive response that is generated to offer the user a service independent of the user requesting the service, the service being derived from the contextual history information.

9. The apparatus of claim 6, wherein the response message comprises information requested by the user and responsive to the action request.

10. The apparatus of claim 6, wherein the action request is a request to receive at least one of bill information, account information, order video content, and live agent access.

11. A non-transitory computer readable medium configured to store instructions that when executed cause a processor to perform:

receiving, via a receiver device, user input information to access an application, the user input information including at least one action request provided by a user device;

authorizing the user to access the application;

storing the user input information as part of a contextual history information record in a database memory, the contextual history information identifying a first session and comprising selection events occurring during the first session and the at least one action request made during the first session;

identifying a user inquiry initiated by the user device;

creating a second session responsive to receiving the user inquiry and retrieving the contextual history information of the first session;

applying the contextual history information to the second session to resume a previous context of the first session;

generating a response message to the selected at least one action request based on the contextual history information and the user inquiry;

forwarding the response message to the user device via a transmitter device via the second session; and generating at least one additional response automatically based on a third party application, the at least one additional response being based on at least a portion of the contextual history information, wherein the at least one additional response is a reminder that is derived from previous user transactions and the stored contextual history information.

12. The non-transitory computer readable medium of claim 11, wherein the user input information comprises at least one of a username, password, user preference and query.

13. The non-transitory computer readable medium of claim 11, wherein the at least one additional response is a predictive response that is generated to offer the user a service independent of the user requesting the service, the service being derived from the contextual history information.

14. The non-transitory computer readable medium of claim 11, wherein the response message comprises information requested by the user and responsive to the action request.

* * * * *